United States Patent [19]
Granqvist

[11] 3,922,175
[45] Nov. 25, 1975

[54] PLURAL CELL BATTERY

[75] Inventor: Carl-Erik Granqvist, Lindingo, Sweden

[73] Assignee: Aktiebolaget Tudor, Stockholm, Sweden

[22] Filed: Aug. 31, 1973

[21] Appl. No.: 393,510

Related U.S. Application Data

[63] Continuation-in-part of Ser. No. 207,304, Dec. 13, 1971, abandoned.

[30] Foreign Application Priority Data
Dec. 14, 1970 Sweden .............................. 16845/70

[52] U.S. Cl. .................................... 136/6 A; 136/43
[51] Int. Cl. ............................................ H01m 35/00
[58] Field of Search ............ 136/6 A, 6 C, 134, 176, 136/10–12, 58, 38, 43, 147

[56] References Cited
UNITED STATES PATENTS

| | | | |
|---|---|---|---|
| 3,170,823 | 2/1965 | Geissbauer | 136/38 |
| 3,269,863 | 8/1966 | Helms | 136/58 |
| 3,429,752 | 2/1969 | Sundberg | 136/147 |
| 3,455,739 | 7/1969 | Field | 136/147 X |
| 3,516,864 | 6/1970 | Willmann | 136/58 |
| 3,553,019 | 1/1971 | Bushrod et al. | 136/6 A |
| 3,690,950 | 9/1972 | Wheadon et al. | 136/58 X |
| 3,738,871 | 6/1973 | Scholle | 136/58 X |

*Primary Examiner*—T. Tung
*Assistant Examiner*—C. F. LeFevour
*Attorney, Agent, or Firm*—Burns, Doane, Swecker & Mathis

[57] ABSTRACT

A plural cell battery composed of a plurality of cells (primary or secondary) wherein the electrodes in adjacent cells are rod-shaped comprising a core of a plastic insulating material surrounded by active material in which several electrical leads of conductive material are imbedded. Electrodes of this type may be interconnected by conducting lines which are arranged to pass straight through the common wall between adjacent cells, or may be connected at one end to a pole bridge and thereby form a tubular plate electrode.

17 Claims, 10 Drawing Figures

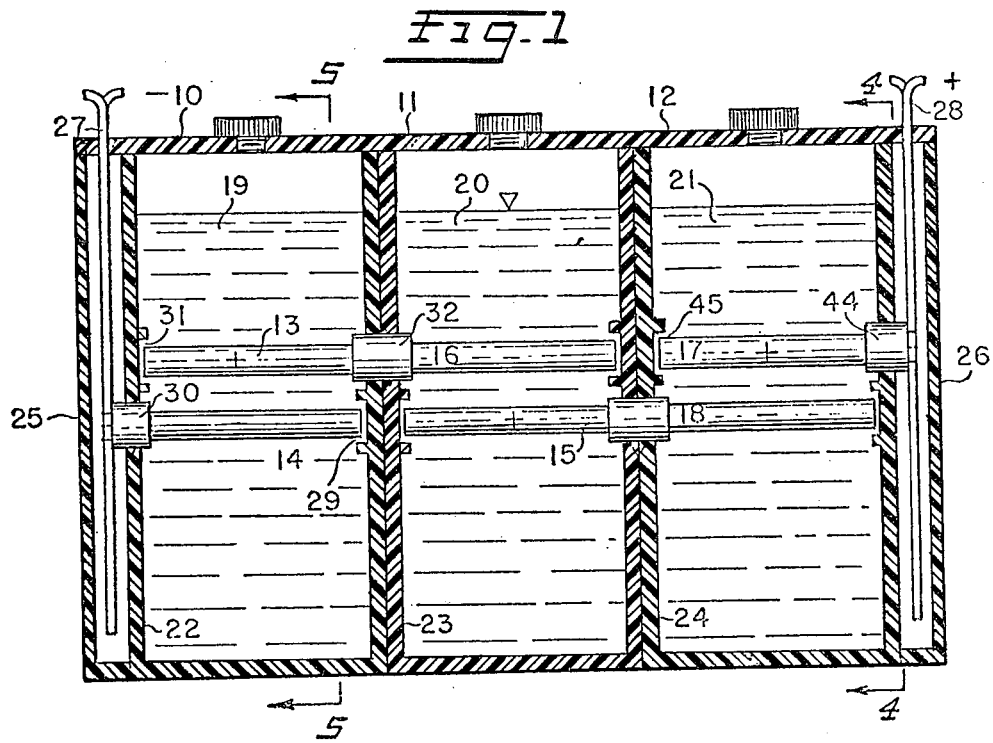
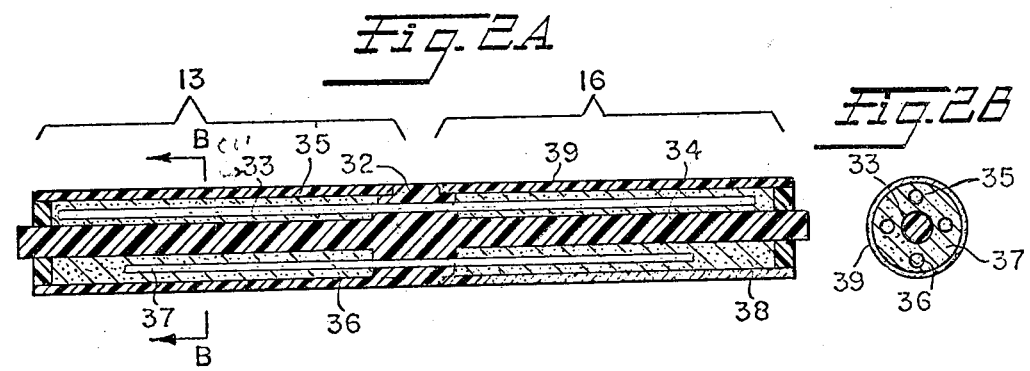
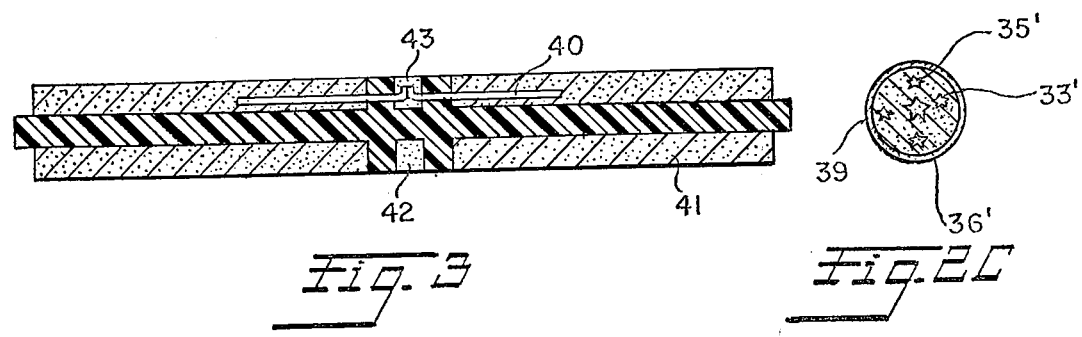

PLURAL CELL BATTERY

This application is a continuation in part of my application Ser. No. 207,304 filed Dec. 13, 1971 now abandoned.

The present invention relates to a battery, and more particularly to a novel tubular electrode. Although the invention also is applicable to batteries of primary cells, it has its greatest importance in connection with batteries of secondary cells and it therefore will be described in more detail in connection with a battery of lead storage cells.

It is known through theoretical calculations that the maximum charge in a lead battery should be 176 watt-hours/kg lead. In this calculation, other material has not been included, such as the weight of the container, electrolyte, connections, and the like. In practice, however, it has up to now never been possible to approach this charge capacity. Usually the charge capacity for existing lead storage batteries is about 23 watt-hours/kg lead during normal operation, and up to 40 watt-hours/kg lead during exceptionally favorable conditions, such as constant discharge with weak current with regular discharge periods, alternating with regular charge periods with constant current, and so on. Therefore, certain standard rules for computation of the discharge conditions have been adopted, and a discharge of the battery during a 20 hour period was assumed. Research has shown that if the discharge is forced, then, immediately, the charge that can be taken from the battery decreases. For example, it has been found during forced discharges that if the battery is "emptied" in only 6 hours, then the useful charge during the discharge period is decreased to less than half of the above-mentioned values.

It is an object of the present invention to provide a battery which will have an improved charge capacity. Investigations into the reason for the low discharge exchange for lead storage batteries as compared with its theoretical maximum have been extended to include other types of secondary batteries such as nickel-iron batteries. These investigations have shown that the identical problems exist for these latter batteries, even though the discharge exchange is not as low as with the lead storage batteries. Continued research has also shown that the same type of problem exists for primary cell batteries, though the discharge exchange for these batteries in many cases is better than for nickel-iron batteries. It should be remembered here that the line of distinction between the concept "secondary cell" and "primary cell" is very hazy, in that most primary cells also can be brought to function as secondary cells, though with a comparatively poor exchange.

It was found that the most meaningful reason for the above-mentioned poor exchange for the other above-discussed batteries of cells is the development of large internal voltage drops. These exist in part in the contact surface between the electrolyte, in part also in the inner connecting lines between the different cells of the battery, and finally in part in the electrodes.

In the traditional lead storage cells, the electrodes are made as flat plates and consist of a grid or the like of lead, in which openings the so-called active material is placed, consisting of Pb in one pole and $PhO_2$ in the other pole. The in- and out-going lines or pole bridges from these electrodes have, as a rule, been made at one edge of these plates. The current, however, is taken or delivered, respectively, through the entire surface of each such electrode, and in the path of the current to the input or the output line, respectively, the current density in the metallic lead material in the electrode is therefore progressively changing, so that the current density is the greatest at the connection to the line or pole bridge. Already, this circumstance associated with the considerably high electric resistance of the line or pole bridge that is made from lead leads to a considerable IR loss in the electrodes. This causes a voltage drop within the electrode so that different parts of the same electrode can have a considerably different potential, and this in turn leads to a variable contact resistance between the electrolyte and the electrode, which appears larger when the potential is lower, and vice versa.

To reduce leakage currents, it has been the past practice for the lines or pole bridges which form connectors between the electrodes to go vertically up from the cell over the edge of a container and down into the next cell. This leads to a rather large potential drop in these lines. In a lead-acid accumulator, these lines also must be made out of lead, since introduction of another metal leads to impurification of the electrolyte, whereby the cells are quickly destroyed. The internal resistance has been a matter of concern, and attempts have been made to reduce it by making the connecting lines between the electrodes of a metal of another type of lesser specific resistance, for example, aluminum covered with lead, so that the aluminum does not come in contact with the electrolyte; but attempts in this direction have not always been successful because it turns out to be exceptionally difficult to accomplish a low resistance electrical contact between the electrode made of lead and the conductor made of aluminum, which in part has small contact resistance and in part is effectively protected from contact by the electrolyte.

It is an object of the present invention to avoid the foregoing difficulties. With the present invention, very desirable results have been achieved. The charge therefor has already been increased to about 60 watt hours/kg lead, which figure should be compared with the above-mentioned value of about 23 watt hours/kg lead, and indications are that with the aid of further refinements, the charge can be increased under certain conditions up to about 100 watt hours/kg lead, which therefore means a four-fold increase of the charge. The importance of this should be evident, when one takes into account that to an increasing degree, storage batteries are used for direct-drive vehicles, especially automobiles, but that up to now these have had a very limited action radius because, due to the weight of storage batteries, the vehicle could not be provided with sufficient charge capacity. Increasing the charge capacity four-fold while keeping the weight of the storage battery the same leads to a four-fold increase in the radius, but in fact the action radius is increased further since the load during travel of the vehicle per charge unit is decreased to about one-fourth.

A further object of the present invention is to provide a novel battery electrode having a central support core of synthetic plastic insulating material that is surrounded by active material. Imbedded in the active material are a plurality of current conducting members that extend parallel to and are spaced from the support core. The electrodes thus can be made as cylindrical rod electrodes. This in turn leads to connecting the current conducting members advantageously to the electrodes in those regions where the current density is considerably equalized. As a direct result of this change of electrode construction, the current density in the contact surface between the electrode and the electroylte will be more evenly distributed than was possible with traditional batteries.

It is a further object to provide a novel tube plate electrode assembly wherein the electrode tubes have a central core of plastic insulating material and a plurality of small diameter, conducting, wire-like members which are connected at one end to the pole bridge and imbedded throughout the active material. Uniformity of current density and hence IR drop can be achieved with the use of conducting members having cross-sectional areas which vary along the length of the electrode.

These and other objects will become more fully apparent from the claims and from the description as it proceeds in conjunction with the appended drawings wherein:

FIG. 1 is a front elevation in section through a battery, consisting of three series coupled storage cells in accordance with the present invention;

FIG. 2A is a front elevation in section of the electrode in the cells of FIG. 1;

FIG. 2B is a section taken along line B—B in FIG. 2A;

FIG. 2C is a section similar to FIG. 2B but of a rod core having a star shaped cross section;

FIG. 3 is a view similar to FIG. 2A but showing a rod electrode which is especially suitable for use with cells of the iron-nickel type;

Figure 4:
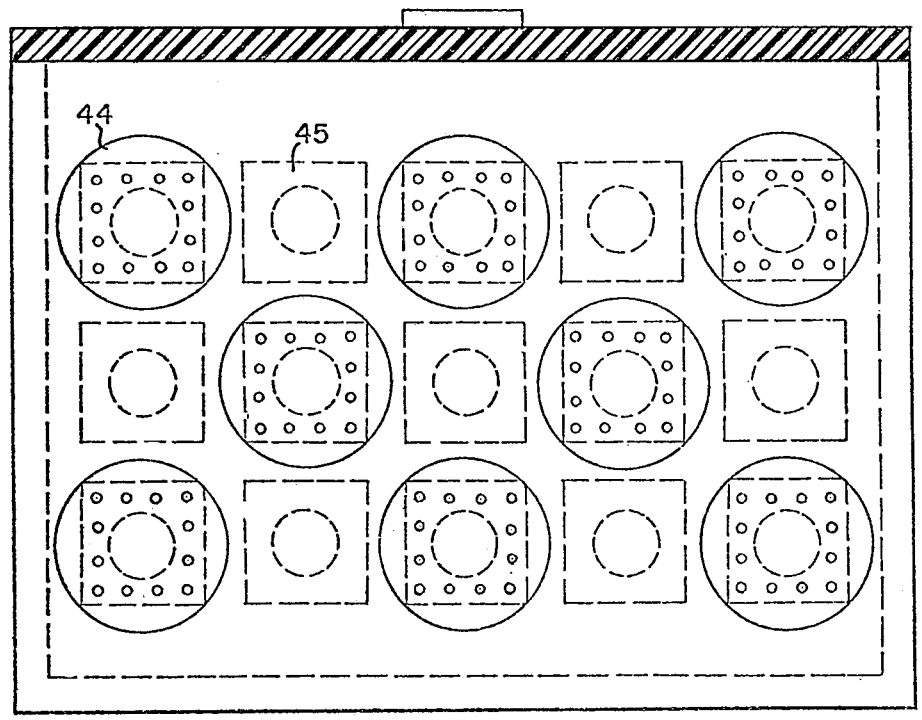
FIG. 4 is a side elevation taken along line 4—4 of FIG. 1.

Referring now to the drawings, FIG. 1 shows a battery composed of three cells 10, 11, and 12. Each cell has its own bottom and side walls, and the battery has a common cover member. To simplify the drawing, only two rod electrodes have been shown in FIG. 1 in each of three cells 10, 11, and 12, namely, in cell 10 the positive electrode 13 and the negative electrode 14, in cell 11 the positive electrode 15 and the negative electrode 16, and in cell 12 the positive electrode 17 and the negative electrode 18.

The cells 10, 11, and 12 contain, in the usual manner, electrolytes 19, 20, and 21 which are held in insulating material containers 22, 23, and 24. It is desirable that at each end of the battery, outside walls 25 and 26, respectively, form separate pockets for carrying the vertical conductors which provide the terminal connections 27 and 28. As will become apparent from consideration of FIGS. 4 and 5, each cell contains a large number of positive and negative electrodes.

Each of the electrodes 13–18 is supported individually by a holder 29, 31 made in one cell wall and by a feedthrough bushing 30, 32 in the other cell wall. For example, electrode 14 is supported on its left side, as shown in the drawing, by a feedthrough bushing 30 in the wall of the cell container 22 and on its right side by a holder 29. The feedthrough bushing 30 connects electrode 14 with the conductor to the negative terminal 27 in the battery. In a similar manner, electrode 13 is supported on its left side by a holder 31 in the container wall and is fastened with the feedthrough 32 in one wall in each of two receptacles 22 and 23 for cells 10 and 11.

With closing of an external electrical circuit, the current from the positive terminal 28 flows to negative terminal 27 and in succession through electrodes 14-13-16-15-18-17 to positive terminal 28. Current passes through the electrolytes in the space between electrodes 14 and 13, 16 and 15, and between electrodes 18 and 17 in the three cells.

Each rod electrode 13–14 is therefore mounted separately in a holder of the type shown, for example, at 29 and 31. Preferably, the electrodes are mounted in these holders with an electrolyte-resistant glue that can withstand the corroding influence of the electrolyte. The rod electrodes also pass through bushings 30 and 32. Bushings 30 and 32 must be tightly sealed and, because of this, it is usually suitable to make them in part of the same material as the casing 22–24. Also, it is desirable to use the same kind of glue that is used to fasten the electrodes in holders 29 and 31, respectively. Through this construction, the rod electrodes 13–18 will serve as supporting elements inside each cell. As a result, the cells can be made with considerably thinner walls while maintaining sufficient stability, whereby the total battery weight is decreased.

In the arrangement shown in FIG. 1, both rod electrodes 13 and 16 and the rod electrodes 15 and 18 are made in one integral part. One such rod electrode is shown in longitudinal section in FIG. 2A; and in cross section in FIG. 2B. The bushing 32 that lies imbedded in the container walls is shown in detail in FIGS. 2A and 2B. Bushing 32 preferably is made of plastic or other suitable insulating material and is provided with a pair of rod cores 33, 34, which extend outwardly in opposite directions so that the rod core 33 will carry positive electrode 13 (FIG. 1), while rod core 34 will carry negative electrode 16. The rod cores 33, 34 may have any suitable cross section so long as sufficient strength is provided for supporting the electrode. The rod cores may be porous or have channels, and may have any suitable diameter.

One or more pairs of collecting conductors 35 and 36 pass through bushing 32. Two pairs of collecting conductors are shown in FIGS. 2B and 2C. Conductors 35, 36 serve to collect the current from the active material 37 and 38, respectively, which is contained around rod cores 33 and 34, respectively. An electrolyte permeable sleeve 39 holds the active material, which is different to the electrodes of different polarity, physically in place. The best balance between the space that is needed for the collecting conductors 35, 36 and the space that is needed for the active material 37, 38 is theoretically obtained for constant current density through the collecting conductors 35, 36. Since the current is fed to the collecting conductors 35, 36, a lesser total conductor area is required as the distance increases from the collecting conductor feedthrough point in bushing 32, and therefore these conductors advantageously can be made of a reduced length, as indicated by conductor 36 which is somewhat shorter than conductor 35.

The current is collected from the active material 37, 38 at the outer surface of the collecting conductors 35, 36 and, if the cell is made for extremely high impulse currents, this surface area should be as large as possible, which suitably can take place if the collecting conductors are made of extruded profile material with for example star shaped cross section profile wires 35' and 36', as shown in FIG. 2C.

Each of the two rod electrodes 14 and 17 may be made with one as one half of the rod shown in FIG. 2A and the other as the second half of the same rod. In these half rod electrodes 14 and 17, the conductors extend beyond the end surface of the bushings 30 and 44, and can either be elongated in the shape of the upwardly extending conductors rising to the terminals 27 and 28 shown in FIG. 1, or can be connected to these rising conductors in any suitable manner, such as by soldering or welding. In the case of a lead storage cell, conductors 35 and 36 must be made out of lead, and where it is important to decrease the internal resistance, the rising conductors located outside the elements should be made of material with better conductivity, for example, copper or aluminum.

In FIG. 2A and FIG. 2B, core rods 33 and 34 have a circular cross section which is desirable especially from a manufacturing point of view. If, however, the quantity of active material is increased further in order to improve the relationship between the charge and the weight of the storage cell, then a significant improvement can be obtained where the rods 33 and 34 are produced to include the star profile, as shown in FIG. 2C.

In the case of a lead cell, the active material consists of Pb and $PbO_2$, respectively, and in the case of an alkaline cell, the active material consists of nickel hydroxide and potassium or iron oxide, respectively. In both cases, this pertains to secondary cells. On example of a primary cell is an alkaline brownstone cell, which has a very low internal resistance and high capacitance. In this case, a zinc cylinder with pressed-in iron or brass rods is used, for example, on one side of the rod, and on the other side of the conductor, a compressed manganese dioxide material is utilized. Diluted potassium hydroxide, which preferably can be gelled, is suitable as an electrolyte in this case.

FIG. 3 shows a rod electrode for a battery of cells which work as secondary cells according to the iron-nickel procedure. The conductors 40 have been compressed with the powder-like active material 41 before being sintered, after forcing it down into a groove 42 in the seal bushing, which groove thereafter was filled with plastic.

The collecting wires or conductors 40 at the feedthrough of the seal bushing and eventually along its entire length, suitably should be made of rather small dimensions. Hereby, the risk of leaks is reduced, in that the axial length of the holes through the seal bushing is long compared with the diameter of the hole. Preferably, the conductors 40 are covered with active material all the way through the container wall, but if this should prove unsuitable in some cases, the conductors can be covered with a suitable semiconducting sleeve. If, in spite of these precautions, a leak should develop, then a known method used in other technical fields to cover the conductors with one or possibly several successive layers of a material can be used, whose expansion coefficient lies between that of the conductor and that of the wall, or, where several such layers are used, successively varying the expansion coefficient step-by-step between the two. In this way, the resulting corrosion of the conductors can be decreased and the useful life of the battery increased. Among the materials with which the conductors can be covered for this purpose are such materials as leadrich glazes and plastics enriched with quartz, carbon, and/or metal powder.

Another method to accomplish a good seal for the seal bushings as they pass through the container wall is to enclose them with an elastic material, for example, thiocarbon polymerization products (i.e., synthetic rubber), which eventually can be made to cure and/or expand when it comes into contact with the electrolyte.

Figure 5:
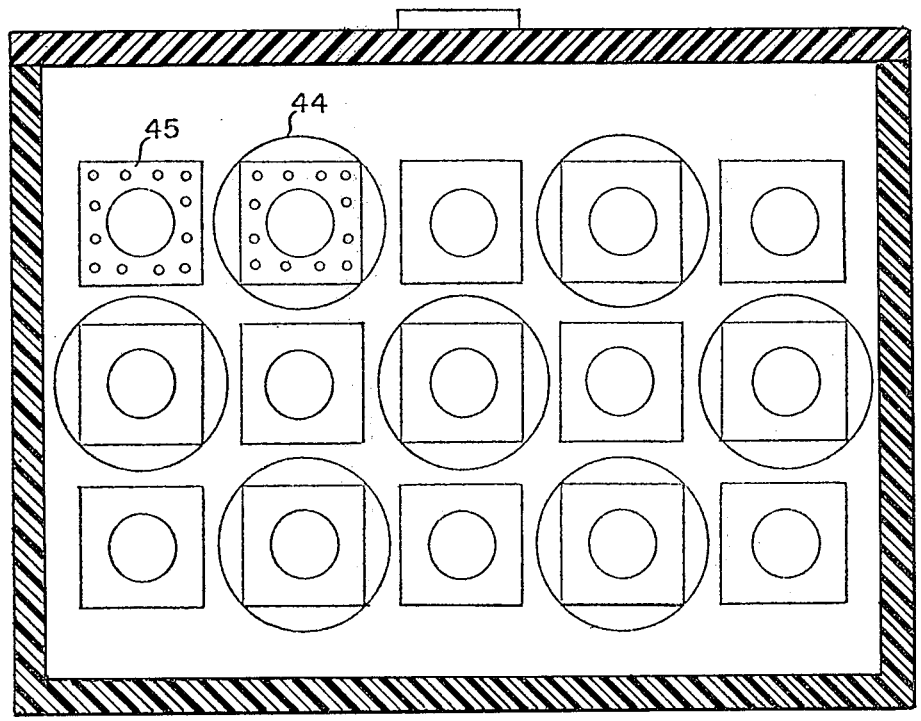
FIG. 5 is a side elevation taken along line 5—5 of FIG. 1.

A preferred placement of the different rod electrodes is made in a diagonal pattern, as shown in FIGS. 4 and 5. FIG. 4 shows the outside of a cell container of a storage battery, for example, container 24, FIG. 1, where the broken lines outline the inside of the wall located on the other side of the same container. The seal bushings of the type shown in FIG. 1 are at 44, again alternating with smooth surface areas, but corresponding to these smooth surface areas are holders 45 made for supporting the other ends of the rod electrodes. Through this arrangement, it will be possible to use only one common casting for the same enclosure. Housings 22 and 24, FIG. 1, have been turned the same way, while container 23 in between is turned the opposite way. Thus, the correct fit between cutout 45 and the feedthrough hole 44 is obtained automatically. With this design constituting the basis for the presentation in FIG. 4 and 5, the rod electrodes have been shown with square cross sections that differ from those in FIG. 2 and FIG. 3. Each such rod electrode contains, therefore, twelve collection conductors.

To obtain the symmetrical placement of the rod electrodes, which are shown in FIGS. 4 and 5, it is necessary that the rod electrodes be arranged in regular horizontal rows, whereby each horizontal row includes an odd number of rod electrodes; for arrangement according to FIGS. 4 and 5, therefore, five rod electrodes are shown such that horizontally as well as vertically alternate rod electrodes belong to one or the other of the terminal systems.

Figure 6:
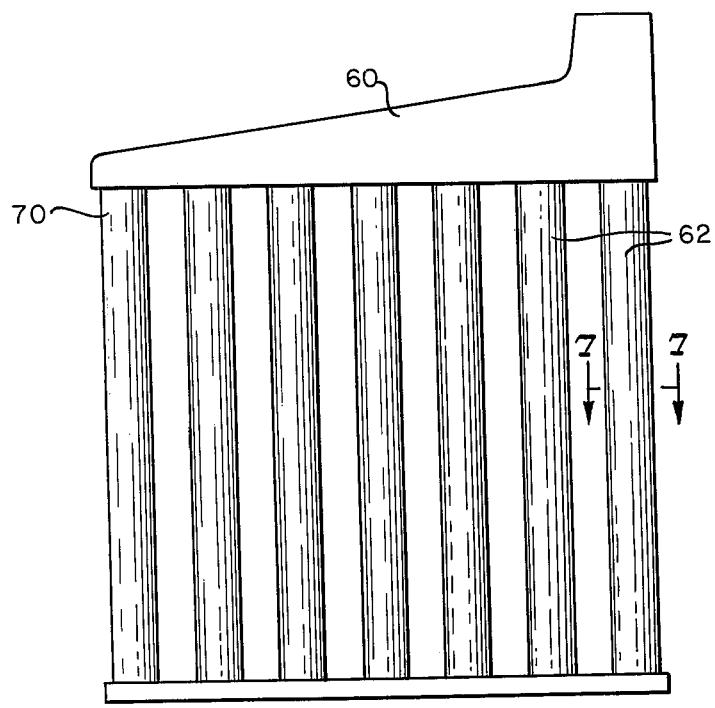
FIG. 6 is an elevation of a tube plate electrode.
Figure 7:
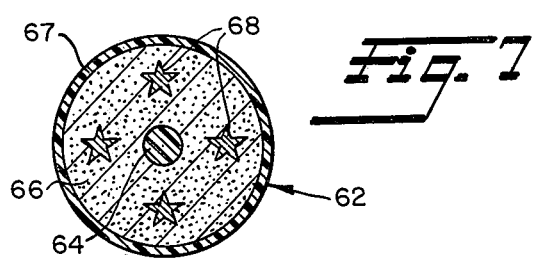
FIG. 7 is a view in section of one tubular electrode member along line 7—7 of FIG. 6.
Figure 8:
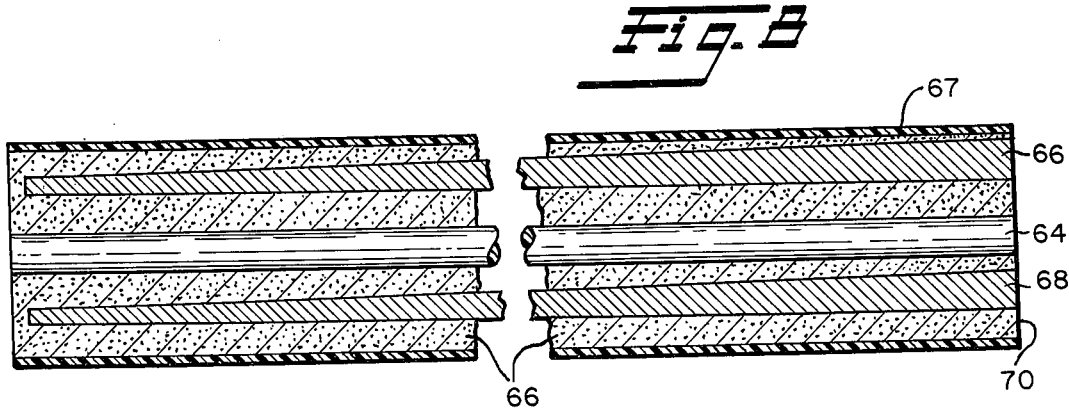
FIG. 8 is a view in longitudinal section of one tubular electrode member illustrating the use of conducting members which have cross-sectional areas that vary along the length of the electrodes.

With reference now to the electrode shown in FIGS. 6–8, this electrode is commonly referred to as a tube plate type and includes a pole bridge 60 of current conducting material and a plurality of tubular electrode members 62. Each member 62 includes a support core or rod 64 of plastic insulating material that is surrounded by active material 66. The active material is enclosed in a perforated sheath 67 of electrolyte resistant insulating material.

Imbedded in the active material 66 are a group of, for example, four current conducting members 68. The members 68 may have a star shaped cross section as described above in connection with FIG. 2C, or be circular, as illustrated in connection with FIG. 2B. The members 68 may have longitudinal axes that are parallel to the axis of core 64 and be spaced from core 64 to have complete contact with the active material 66.

The current conducting members 68 may be tapered to have a cross-sectional area which varies along the length of the electrode. At the upper end 70 which is joined to the pole bridge 60 the cross-sectional area is somewhat larger than at the lower end to thereby tend to provide a more uniform current density in the conducting material and thus maintain the IR drop more nearly uniform. Alternatively, a larger number of small diameter wires 68 having uniform diameters but lengths which vary may be used. Obviously, all of the wires are connected to the pole bridge 60, and the lengths and positions of the wires are selected to provide a substantially uniform current density in the conducting members throughout the length of the tubular electrode.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. In a battery having a plurality of cells with each cell having an electrolyte, an electrode for said cell including a tubularly shaped member comprising an elongated support core of synthetic plastic insulating material extending along the axis of the tubularly shaped member surrounded by active material, and a plurality of current conducting members imbedded in the active material, said current conducting members extending along the axis of the core and being spaced from the outer surfaces of said core.

2. A battery as defined in claim 1 wherein the current conducting members are substantially equally spaced around the periphery of said support core.

3. A battery as defined in claim 2 further including an outer sleeve of porous insulating material surrounding said tubular electrode, said active material being located inside said sleeve and surrounding said conducting members and said support core.

4. A battery as defined in claim 3 wherein the current conducting members have axes that are substantially parallel to the axis of the core rod of insulating material.

5. A battery as defined in claim 4 wherein the current conducting members have a substantially circular cross section.

6. A battery as defined in claim 4 wherein the current conducting members have a substantially star shaped cross section.

7. A battery as defined in claim 3 wherein the cross-sectional area of said current conducting members varies from one end of the electrode to the other in such fashion as to provide a substantially uniform current density throughout the length of said electrode.

8. A battery as defined in claim 7 wherein the conducting members in an electrode are of differing lengths.

9. A battery as defined in claim 7 wherein the conducting members are tapered and have the largest cross-sectional area at the region where the current is the highest.

10. A battery as defined in claim 7 wherein said electrode comprises a plurality of said tubular shaped members connected at one end to a pole bridge and thereby to provide a tubular plate electrode.

11. A battery as defined in claim 1 wherein the current conducting members have axes that are substantially parallel to the axis of the core of insulating material.

12. A battery as defined in claim 1 wherein the current conducting members have a substantially circular cross section.

13. A battery as defined in claim 1 wherein the current conducting members have a substantially star shaped cross section.

14. A battery as defined in claim 1 wherein the cross-sectional area of said current conducting members varies from one end of the electrode to the other in such fashion as to provide a substantially uniform current density throughout the length of said electrode.

15. A battery as defined in claim 14 wherein the conducting members in an electrode are of differing lengths.

16. A battery as defined in claim 14 wherein the conducting members are tapered and have the largest cross-sectional area at the region where the current is the highest.

17. A battery as defined in claim 1 wherein said electrode comprises a plurality of said tubular shaped members connected at one end to a pole bridge and thereby to provide a tubular plate electrode.

* * * * *